Figures 1, 2:
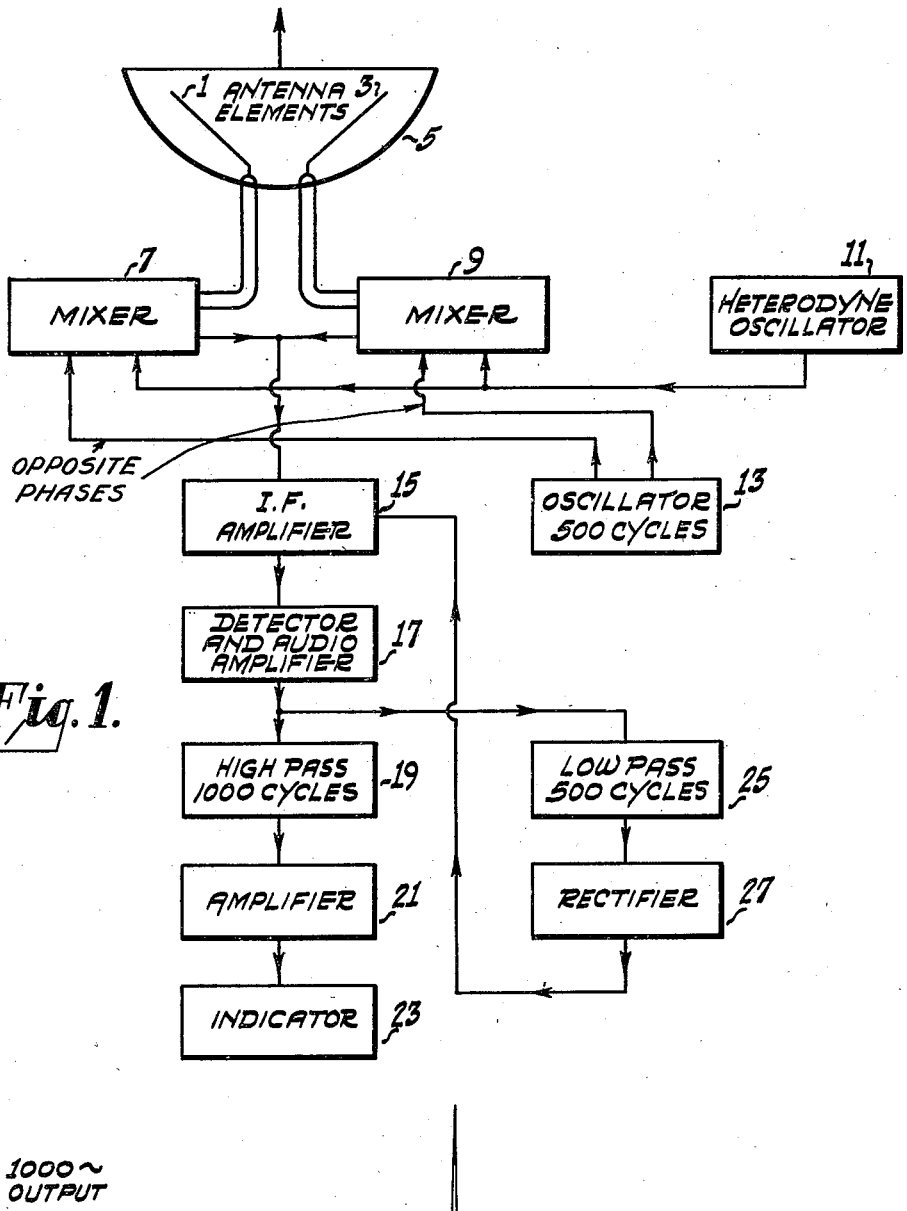

Patented June 10, 1947

2,422,096

UNITED STATES PATENT OFFICE 2,422,096

DIRECTION FINDING SYSTEM

Clarence W. Hansell, Port Jefferson, N. Y., assignor to Radio Corporation of America, a corporation of Delaware Application September 30, 1942, Serial No. 460,297

5 Claims. (Cl. 250—11)

1

This invention relates to radio direction finding, and more particularly to a system wherein bearing indications are produced with maximum signal pickup, rather than with minimum or zero signal pickup.

Direction finders ordinarily operate by virtue of a directive antenna system which responds to arriving waves in accordance with some function of the angle between the direction of wave arrival and the direction of maximum antenna response. It is characteristic of conventional directive antennas that the response is relatively independent of said angle when the angle is small. This results in a relatively broad or indeterminate bearing indication if the antenna alignment providing maximum signal pickup is used. On the other hand, the response changes relatively rapidly with small changes in angle near the position of minimum or zero pickup, providing a relatively narrow angular range of minimum pickup, i. e., a "sharp null." Hence it is customary to operate direction finders to provide bearing indications with zero or minimum antenna output, although there are certain disadvantages to this type of operation.

Among these disadvantages is the fact that the weaker the signal received, the broader becomes the null. Also, a false indication may result from a temporary cessation of the signal, or from fading. A further and very important effect is that of noise and interference, which may mask the desired signal at angles near the null, causing an apparent broadening thereof.

Accordingly, it is an object of this invention to provide an improved method of and means for direction finding, wherein bearings are taken while the antenna output is near its maximum.

Another object is to provide an improved system for direction finding, employing two separate antennas with overlapping directive patterns and means for indicating equality of the responses of said antennas.

These and other objects will become apparent to those skilled in the art upon consideration of the following description with reference to the accompanying drawing, of which Fig. 1 is a schematic block diagram of an embodiment of the invention, and Fig. 2 is a graph illustrating the directional response of the system of Fig. 1.

Referring to Fig. 1, two antenna elements 1 and 3 are mounted in a reflector 5 in such positions that the directive patterns of the two antennas are not coincident, but do overlap each other. The antenna assembly, including the reflector 5, may be mounted in any suitable manner, not shown, so as to be rotatable about a

2 vertical axis. The antenna 1 is connected to a heterodyne detector or mixer 7, and the antenna 3 is connected to a similar mixer 9. A heterodyne oscillator 11 is connected in the same way to both mixers 7 and 9. A low frequency oscillator 13, providing output at, for example, 500 cycles per second, is connected in phase opposition to the mixers 7 and 9 so as to modulate their outputs. The outputs of the mixers 7 and 9 are supplied together to a variable gain intermediate frequency amplifier 15. The amplifier 15 is in turn connected to a detector and audio amplifier 17. The output of the device 17 is supplied through a high pass filter 19 and an amplifier 21 to a voltage amplitude responsive indicator 23. The indicator 23 may be of the visual type, such as a meter, the aural type, such as a loudspeaker or a pair of headphones, or in fact any voltage amplitude responsive device.

The output of the device 17 is also applied through a low pass filter 25 to a rectifier 27. The output of the rectifier 27 is applied to the gain control circuit of the intermediate frequency amplifier 15 so as to vary the gain as an inverse function of the magnitude of the output of the rectifier 27.

The adjustment and operation of the system is as follows: The outputs of the antennas 1 and 3 are heterodyned in the mixers 7 and 9 respectively with the output of the oscillator 11, providing signals at an intermediate frequency which are proportional in their amplitudes to the respective antenna outputs. The outputs of the oscillator 13 to the mixers 7 and 9 are in opposite polarities, and are adjusted to a level such that the mixers are allowed to operate alternately, each operating during approximately one-fourth of each cycle of the oscillator 13.

When the two antenna outputs are equal, the combined output from the mixers 7 and 9 appears in the intermediate frequency amplifier 15 with 1000 cycle modulation. When the two antenna outputs are unequal there will be in addition a 500 cycle modulation component. The modulated intermediate frequency output of the amplifier 15 is detected and amplified by the device 17, and the modulation components are separated by the filters 19 and 25. The 500 cycle component is rectified by the device 27, and controls the gain of the amplifier 15.

Thus if the antenna assembly is pointed in the general direction of a transmitter to which the system is tuned, some 1000 cycle energy will be supplied to the indicator 23, but the gain of the amplifier 15 will be held down to a low or moderate value by the rectified 500 cycle output of the device 27. As the antenna is rotated toward a position pointing directly at the transmitter the 1000 cycle output increases rather slowly until this position is reached. (See Fig. 2.) When the antenna is rotated through the exact position in which it points at the transmitter, the antenna outputs become equal, and the 500 cycle modulation component goes to substantially zero value. The gain control voltage applied to the amplifier 15 likewise goes to zero, providing a sharp increase in the amplitude of the 1000 cycle voltage applied to the indicator 23. This is illustrated by the peak in the directional response curve of Fig. 2.

Thus the invention has been described as a system which provides extremely sharp directional indications at substantially the maximum response of a directive antenna system. This is accomplished by the use of two antennas arranged which overlap along a desired reference direction. The outputs of the two antennas are modulated and combined so as to provide one modulation component related to their sum and a second modulation component related to their difference in amplitude. The second component is then used to control inversely the magnitude of the first, providing a great increase in amplitude of the sum component upon equality of the two antenna outputs.

I claim as my invention:

1. The method of determining the azimuth of arrival of an electromagnetic wave comprising the steps of deriving from said wave two signals differently related in their amplitudes to the angle between the line of arrival of said wave and a reference direction, modulating said signals in opposite modulation phases, combining said modulated signals so as to produce a first modulation component related in amplitude to the sum of the amplitudes of said signals and a second modulation component related in amplitude to the difference of the amplitudes of said signals, amplifying said combined signals, separating said amplified modulation components, controlling the amplification of said combined signals in response to the magnitude of one of said amplified components, and determining said azimuth as a function of the magnitude of the other of said amplified modulation components.

2. The method of indicating equality of the amplitudes of two signals, comprising the steps of modulating said signals in opposite phases, combining said modulated signals to provide two modulation components related in amplitude respectively to the sum and to the difference of the amplitudes of said signals, amplifying and detecting said modulated and combined signals; controlling the extent of said amplification in accordance with the amplitude of one of said amplified modulation components, and indicating said equality of amplitudes as a function of the amplitude of the other of said amplified components.

3. A radio direction finder including means for deriving from a radio wave two signals differently related in amplitude to the azimuth of arrival of said wave, common oscillator means for modulating said signals separately and in opposite phases, means for combining said modulated signals to produce different modulation components related in amplitude to the sum and to the difference respectively of the amplitudes of said signals, and means for varying the amplitude of one of said components in response to variations in the amplitude of the other of said components.

4. A radio direction finder including two directive antennas so positioned with respect to each other as to provide overlapping response patterns, an oscillator, means for modulating the outputs of said antennas in opposite modulation phases with the output of said oscillator, an amplifier ararnged to amplify the modulated outputs of both of said antennas, a detector connected to said amplifier, filter means arranged to separate components in the output of said detector having the frequency of said oscillator from components having twice the frequency of said oscillator, indicator means arranged to respond to said latter components, and rectifier means arranged to derive from said former components a voltage for controlling the gain of said amplifier.

5. A radio direction finder comprising two directive antennas positioned to provide overlapping response patterns, common oscillator means for modulating the outputs of said antennas in opposite modulation phases, and means for combining said outputs so as to provide two different modulation components, indicator means responsive to one of said components, and means responsive to the other of said components to control the amplitudes of both of said components.

CLARENCE W. HANSELL.

REFERENCES CITED

The following references are of record in the file of this patent:

UNITED STATES PATENTS

| Number | Name | Date |
|---|---|---|
| 2,061,737 | Offenhauser | Nov. 24, 1936 |
| 2,226,366 | Braden | Dec. 24, 1940 |